United States Patent
Krell et al.

(10) Patent No.: US 6,399,528 B1
(45) Date of Patent: Jun. 4, 2002

(54) POROUS ALUMINUM OXIDE STRUCTURES AND PROCESSES FOR THEIR PRODUCTION

(75) Inventors: Andreas Krell; Frank Buse; Hongwei Ma, all of Dresden (DE)

(73) Assignee: Fraunhofer-Gesellschaft zur Forderung der Angewandten Forschung e.V., Munich (DE)

( * ) Notice: Subject to any disclaimer, the term of this patent is extended or adjusted under 35 U.S.C. 154(b) by 0 days.

(21) Appl. No.: 09/797,848

(22) Filed: Mar. 5, 2001

(30) Foreign Application Priority Data

Sep. 1, 2000 (EP) .............................................. 00118972

(51) Int. Cl.$^7$ .......................... C04B 35/10; C04B 35/48
(52) U.S. Cl. .......................... 501/80; 501/85; 501/105; 501/127; 501/153; 423/625; 423/628; 427/419.2; 427/419.3; 264/43
(58) Field of Search ................................ 423/625, 628; 501/105, 127, 153, 80, 85; 427/419.2, 419.3; 264/43

(56) References Cited

U.S. PATENT DOCUMENTS

| | | |
|---|---|---|
| 4,285,732 A | 8/1981 | Charles et al. |
| 5,266,548 A | 11/1993 | Koradia et al. |
| 5,551,963 A | 9/1996 | Larmie |
| 5,837,634 A | 11/1998 | McLaughlin et al. |

FOREIGN PATENT DOCUMENTS

| | | |
|---|---|---|
| DE | 4436644 | 4/1996 |
| DE | 19702091 | 7/1998 |
| EP | 0657399 | 6/1995 |
| GB | 2071073 | 9/1981 |
| JP | 62-21750 | 1/1987 |

OTHER PUBLICATIONS

R.L. Coble, "Sintering Crystalline Solids. I. Intermediate and Final State Diffusion Models", Journal of Applied Physics, vol. 32, No. 5, pp. 787–792 (1961).

D. Lynn Johnson, "A General Model for the Intermediate Stage of Sintering", Journal of the American Ceramic Society, vol. 53, No. 10, pp. 574–577 (1970).

C. Greskovich et al., "Grain Growth in Very Porous $Al_2O_3$ Compacts", Journal of the American Ceramic Society, vol. 55, No. 3, pp. 142–146 (1972).

K. Bhatia et al., "Pressure Assisted Sintering of Mixtures of Alumina/Zirconia Powders", Abstract of lecture S1–061–99 at the 23rd Annual Cocoa Beach Conference and Exposition, (1999).

V.I. Vereshchagin et al., "Kinetics and Mechanism of the Transformation of Low–Temperature Alumina Modifications to –Al2O3 in the Presence of Additives", Zhurnal Prikladnoy Khimii, vol. 55, No. 9, pp. 1947 to 1951 (1982).

L.A. Xue et al., "Influence of Additives on the $\gamma$–to–$\alpha$ Transformation of Alumina", Journal of Materials Science Letters, vol. 11, pp. 443–445 (1992).

*Primary Examiner*—Paul Marcantoni
(74) *Attorney, Agent, or Firm*—Greenblum & Bernstein, P.L.C.

(57) ABSTRACT

The present invention relates to a porous aluminum oxide structure comprising $Al_2O_3$ and Zr, the structure having an open porosity greater than about 30% and an average pore size from about 20 nm to about 1000 nm, wherein the Zr, expressed as $ZrO_2$, has a concentration less than about 5 weight % of the weight of the $Al_2O_3$. The present invention also relates to a process for producing a porous aluminum oxide structure comprising $Al_2O_3$ and Zr, the structure having an open porosity greater than about 30% and an average pore size from about 20 to about 1000 nm, through doping alumina or precursors thereof with a doping effective amount of Zr, wherein the Zr, expressed as $ZrO_2$, has a concentration less than about 5 weight % of the weight of the $Al_2O_3$, the process comprising: introducing the Zr into the alumina or the precursors thereof, the Zr being selected from at least one $ZrO_2$ powder, a solution of a Zr precursor, or mixtures thereof, by admixing the Zr with the alumina or the precursors thereof, forming a green body, drying the green body, and sintering the dried body to produce the porous aluminum oxide structure.

21 Claims, No Drawings

POROUS ALUMINUM OXIDE STRUCTURES AND PROCESSES FOR THEIR PRODUCTION

CROSS-REFERENCE TO RELATED APPLICATIONS

The present application claims priority under 35 U.S.C. §119 of European Application No. EP 00118972.9, filed on Sep. 1, 2000, the disclosure of which is expressly incorporated by reference herein in its entirety. The present application also incorporates by reference herein in its entirety the disclosure of German Patent Application No. 199 43 075.6, filed on Sep. 3, 1999.

BACKGROUND OF THE INVENTION

1. Field of the Invention

The invention relates to technical ceramics and to porous aluminum oxide structures and processes for their production. These production processes also relate to those processes used for the production of mesoporous filtration membranes, more coarsely structured intermediate layers or filter substrates, as well as catalytic converter substrates.

2. Discussion of Background Information

Filter modules made of $Al_2O_3$ have been available for some time and may typically comprise a construction of several layers having graduated pore sizes. Although coarsely porous ceramic oxide filter substrates usually comprise corundum ($\alpha$-$Al_2O_3$), and optionally glass as binding agents, predominantly solutions of transitional aluminas ($\gamma$-, $\delta$-, or $\kappa$-$Al_2O_3$) have been used for the separating layers and the transitional aluminas are usually deposited via a sol/gel process in the mesoporous range of 20–60 nm, which is advantageous for application techniques. The transitional aluminas used in the sol/gel process comprises precursors of $Al_2O_3$. However, a construction of pure corundum is desired due to the more disadvantageous chemical and thermal stability of transitional alumina as compared to $\alpha$-$Al_2O_3$.

It would be technologically advantageous to produce the more coarsely structured intermediate layers using the sol/gel process, that is, layers intermediate between a separating layer comprising 80 nm particles and the substrate having pore sizes of 1–2 μm; however, no previously used sol/gel process has been able to produce $Al_2O_3$. structures having a sufficient pore size of more than about 50–100 nm and a sufficiently high porosity of greater than about 30% by vol., and preferably greater than about 40% by vol. Typically, the known sol/gel processes produce only more finely grained, mesoporous structures, which comprise the above-mentioned transitional phases of $Al_2O_3$. When these structures are ignited at high temperatures in order to enlarge the pores, a considerable increase in pore size does not occur until the transition to the thermodynamically stable corundum phase and, therefore, it is connected to a sudden collapse of the porosity to low levels reducing its usability.

Further, powder technologies using $Al_2O_3$ powder, instead of precursors of the $Al_2O_3$ powder, cannot be used for producing porous layers of the aforementioned type, since layers of powder, which are formed by dip coating in powder slips, have a very high compacting density due to the grain sizes of 0.1–1 μm in the unsintered state of the powder and do not allow a connection of pores in a desired size range of 100–500 nm with porosities greater than about 40% by vol.

Heretofore, it has not been known how to produce mesoporous $Al_2O_3$ structures of high porosity comprising corundum and having an average pore size of 20–60 nm.

Nor has it been known how to use in sol/gel-processes other solutions known for producing sintered, highly porous $Al_2O_3$ structures having desired larger pore sizes from about 50 to about 1000 nm.

To make the sol/gel process usable for producing intermediate layers of commercial precursors (such as DISPERAL®, a boehmite made by Condea Chemie, Hamburg, Germany), a considerable material transport must be allowed at high porosity and must remain at a high porosity level during ignition. Since the boehmite has primary particle sizes of 2–7 nm and agglomerate sizes of 30–60 nm, usual annealing conditions will lead to smaller pores as desired here. On the other hand, sol/gel-processes originating from such boehmites are known for small particle sizes and a strong surface curvature of the particles leading to a high sintering activity and enhancing the dense sintering. Within the known theories for solid phase sintering, it cannot be expected, therefore, that it is possible to overcome the above-mentioned problems in the production of mesoporous corundum structures and of structures having pore sizes of 50–1000 nm, while maintaining an evenly high porosity. Thus, according to valid theories, considerable pore growth is related to grain growth which is always parallel to a considerable reduction of residual porosity. Thus, according to Coble, J. Appl. Physics, vol. 32(5), pp.787–792 (1961), which is incorporated by reference herein in its entirety, the sintering process comprises three stages:

An initial stage is characterized by the increase of the sintering necks from zero to an area equivalent to ½ of the cross section area of the particles. The process is accompanied by a small percentage of shrinkage which already represents a reduction of porosity from the originally typical 40–50% (at a relative initial density of 50–60%) to 30–40%, without a considerable growth of the particles even being possible. During annealing, the porosity already reduces in the initial stage of the sintering process, and without any grain or pore increase, to values that mark the limit of usability for many highly porous products.

An intermediate stage begins when the first moderate, grain growth and a change in the shape of the pores start the transformation into a structure having pores and larger amounts of grain limits. The overwhelming amount of porosity is open; during the sintering process, porosity reduction correlates with shrinking cylindrical pore channels with an overall low grain growth. See Johnson, J. A. Ceram. Soc. 53(10), pp. 574–577 (1970), which is incorporated by reference herein in its entirety, who assumes a constant particle size for his model of an intermediate stage. See also Greskovich u.a., J. Am. Ceram. Soc. 55 pp. 142–146 (1972), which is incorporated by reference herein in its entirety, whose measurements show in MgO-doped $Al_2O_3$ a grain growth from 300 to 660–850 nm, while simultaneously cutting porosity in half.

A final stage starts with the transformation to closed porosity and corresponds with an increased grain growth and an enlargement of the average pore size, with a considerable reduction of porosity.

SUMMARY OF THE INVENTION

The present invention provides porous aluminum oxide structures comprising $\alpha$-$Al_2O_3$ that, at a high porosity, have mesoporous pore structures having average pore sizes in the range from about 20 to about 60 nm. A mesoporous structure as referred to herein is a structure having a pore size between about 2 to about 60 nm. The present invention also provides porous aluminum oxide structures comprising $\alpha$-$Al_2O_3$ that, at a high porosity, have pore structures in larger average pore sizes up to about 1000 nm. Here, pore sizes are defined as average "effective" pore diameters that result from conventional methods of mercury-porosimetrical measurements. Since real open pore structures cannot have ideal spheric or cylindrical forms, no real "diameter" is present in the pores. Thus, the pore diameter results as the effective value based on known geometrical models.

The porous aluminum oxide structures are producible by powder techniques as well as by sol-gel processes. Additionally, porous aluminum oxide structures are producible over the entire range of pore sizes of $\alpha$-$Al_2O_3$.

The present invention relates to a porous aluminum oxide structure comprising $Al_2O_3$ and Zr, the structure having an open porosity greater than about 30% and an average pore size from about 20 to about 1000 nm, wherein the Zr has a concentration which, expressed as $ZrO_2$ based on $Al_2O_3$, constitutes less than about 5 weight % of the weight of the $Al_2O_3$.

The porous aluminum oxide structure preferably has an open porosity greater than about 40% and the $Al_2O_3$ comprises $\alpha$-$Al_2O_3$.

The porous aluminum oxide structure preferably can have an average pore size from about 20 to about 60 nm or can have an average pore size from about 50 to about 1000 nm.

In another aspect of the present invention, the porous aluminum oxide structure comprises $\alpha$-$Al_2O_3$ and has an open porosity greater than about 30% and an average pore size of from about 20 to about 60 nm, and preferably an open porosity greater than 40%.

In yet another aspect of the present invention, the porous aluminum oxide structure can have an open porosity greater than about 30% and an average pore size of from about 50 to about 1000 nm, and preferably an open porosity greater than about 40%.

In a further aspect of the present invention, the porous aluminum oxide structure comprises $\alpha$-$Al_2O_3$ and the Zr has a concentration which, expressed as $ZrO_2$ and based on $Al_2O_3$, constitutes less than about 5 weight % of the weight of the $Al_2O_3$. The porous aluminum oxide structure also can have an open porosity greater than about 30% and an average pore size from about 20 to about 1000 nm, and preferably an open porosity greater than 40%.

In a preferred aspect of the present invention, the porous aluminum oxide structure can have an average pore size from about 50 nm to about 1000 nm, or can have an average pore size from about 20 nm to 60 nm.

The present invention also relates to a porous aluminum oxide structure comprising $\alpha$-$Al_2O_3$, and Zr, wherein the Zr has a concentration which, expressed as $ZrO_2$ and based on $Al_2O_3$, from about 0.03 to about 1.5 weight % of the weight of the $Al_2O_3$. The porous aluminum oxide structure can also have an open porosity greater than about 40% and an average pore size from about 50 to about 1000 nm.

The present invention also relates to a process for producing a porous aluminum comprising $Al_2O_3$ and Zr, the structure having an open porosity greater than about 30% and an average pore size from about 20 to about 1000 nm, through doping alumina or precursors thereof with a doping effective amount of Zr, wherein the Zr, expressed as $ZrO_2$, has a concentration less than about 5 weight % of the weight of the $Al_2O_3$, wherein the process comprises: introducing the Zr into the alumina or the precursors thereof, the Zr being selected from at least one $ZrO_2$ powder, a solution of a Zr precursor, or mixtures thereof, by admixing the Zr with the alumina or the precursors thereof, forming a green body, drying the green body, and sintering the dried body to produce the porous aluminum oxide structure.

In the process, the Zr can be introduced into the alumina or the precursors thereof by admixing the Zr in the alumina or the precursors thereof.

In another aspect of the present invention, the Zr can be introduced into the alumina or the precursors thereof by introducing the at least one $ZrO_2$ powder into the alumina or the precursors thereof through milling a suspension of the alumina or the precursors thereof with $ZrO_2$ balls.

In the process, the green body can be formed by casting the admixture into a mold. In yet another aspect of the present invention, the green body can be formed by dip coating a porous substrate to form a membrane layer.

The sintering can take place at a temperature from about 700° C. to about 1600° C., preferably from about 850° C. to about 1400° C., and more preferably from about 900° C. to about 1370° C.

Other exemplary embodiments and advantages of the present invention may be ascertained by reviewing the present disclosure.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The porous aluminum oxide structures according to the present invention are preferably provided with a Zr dopant.

The process for producing porous aluminum oxide structures according to the present invention comprises adding a Zr dopant during production in such a concentration that it is less than about 5 weight % expressed as $ZrO_2$ based on the weight of $Al_2O_3$.

The production process, according to the present invention, provides porous aluminum oxide structures having an open porosity greater than about 30%, preferably greater than about 35%, and more preferably greater than about 40%. Open porosity is defined as percentage of pores that are not completely closed, i.e., the pores have passageways connected to each other.

The production process, according to the present invention, provides porous aluminum oxide structures having an average pore size from about 20 nm to about 1000 nm, and more preferably from about 20 nm to about 500 nm.

The production process, according to the present invention, provides porous aluminum oxide structures having a Zr content, which, expressed as $ZrO_2$ and based on the weight of $Al_2O_3$, is less than about 10 weight % $ZrO_2$, preferably less than about 5 weight %, and more preferably less than about 1.5 weight % $ZrO_2$.

The Zr can be incorporated into the structures in the known manner by using known $ZrO_2$ materials or precursors. $ZrO_2$ precursors are those compounds which are hydrolyzable in water and ultimately form $ZrO_2$ or optionally hydrated $ZrO_2$. These $ZrO_2$ precursors include, but are not limited to $ZrOCl_2$, or $Zr(OR)_4$ where R is alkyl or lower alkyl. Preferably, the lower alkyl can be from 1 to 7 carbon atoms, either straight chain or branched alkyl, including isopropyl and isobutyl. More preferably, R can be $CH_3$, $C_2H_5$, $C_3H_7$ or $C_4H_9$. A preferred Zr precursor is aqueous zirconium oxychloride solution. To incorporate the Zr, the sol/gel processes as well as the powder technological processes can be used.

A particularly advantageous high porosity can be maintained up to high annealing temperatures by using from about 0.03 weight % to about 1.5 weight % $ZrO_2$. Smaller additions reduce the desired effect of stabilization of high porosity in the product, preferably exceeding 40 vol. %; higher concentrations can cause undesired side effects, such as the modification of the chemical behavior of the created products.

The effect of low Zr dopant ($ZrO_2$ after conventional air sintering) noted here cannot be explained and is not equivalent to any other known effects of this addition during the sintering of $Al_2O_3$. JP 62-21750, which is incorporated by reference herein in its entirety, has reported that higher amounts of $ZrO_2$ enhance the sintering of corundum. However, K. Bhatia u.a., "Pressure Assisted Sintering of Mixtures of Alumina/Zirconia Powders", 23rd Annual Cocoa Beach Conference, The Am. Ceram. Soc., Jan. 24–29, 1999, Lecture S1-061-99, which is incorporated by reference herein in its entirety, has reported that low additions less than about 1% $ZrO_2$ impede the sintering of corundum. Both results only point, in one case, to a general diffusion accelerating effect, and, in the other case, to a diffusion slowing effect of different $ZrO_2$-concentrations. GB 2,071,073 A and B2, which is incorporated by reference herein in its entirety, is analogous to one of the countless examples that describe the impeding effect of low $ZrO_2$ concentrations to the grain growth of sintering corundum.

In contrast thereto, the present invention provides the conditions for a surprisingly different effect that enables the ignition with advanced pore growth at an almost constant porosity (i.e., reduced densification).

It is believed that Zr or $ZrO_2$ probably contaminates the surface of the still highly porous $Al_2O_3$ in such a way that diffusion processes driving the densification are largely decelerated without stopping the leading diffusion processes necessary for the pore growth. The present invention uses Zr or $ZrO_2$ for producing highly-porous $Al_2O_3$ sintering products of a defined pore structure in such a way that it is equally usable for powder technical processes using $Al_2O_3$ powder as well as for sol/gel processes using precursors of $Al_2O_3$.

It should be noted that the influence of the Zr dopant and/or the $ZrO_2$ dopant for the phase transformations to be performed can obviously be different depending on the existing conditions of the sol/gel processes. Vereshtshagin et al., Zh. Prikladnoy Khimii vol. 55(9), pp. 1946–51 (1982), which is incorporated by reference herein in its entirety, reports that $Zr^{4+}$ has no effect on the corundum yield, i.e., with $Zr^{4+}$ as well as without it, 88–90% corundum results at 1250° C. However, Xue, J. Mater. Sci. Lett. vol. 11(8), pp. 443–445 (1992), which is incorporated by reference herein in its entirety, finds, among other things, an aggravated corundum formation with an increased temperature from 1216° C. to 1291° C. under the influence of $ZrO_2$ added as oxychloride.

On the other hand, the sol/gel process of the present invention comprising dispersing the above-mentioned boehmite with Zr and/or $ZrO_2$ dopant provides a very high yield of corundum at 1150° C. and, starting at approximately 1200° C., only corundum is produced which, in contrast to previously known results, indicates a transformation accelerating effect of this type of dopant.

A particular advantage of the present invention is the fact that mesoporous aluminum oxide structures comprising corundum and having intermediate pore sizes from about 20 to about 60 mn can be produced with high porosity greater than about 30%, and preferably greater than about 40%.

Another particular advantage of the present invention is that the structures having the listed characteristics can be produced equally well by a process using powders (the Zr compound is in powder form) as well as by sol/gel processes which use a hydrolyzable Zr precursor.

In accordance with the present invention, the sol/gel processes or the powder processes can produce $Al_2O_3$. structures with coarser pore structures, i.e., more coarsely structured intermediate layers or substrates, which are characterized by an open porosity greater than about 30%, and preferably greater than about 40%, by average pore sizes from about 50 to about 1000 nm, and preferably from about 100 to about 500 nm, and by a Zr content of less than 5 weight %, expressed as $ZrO_2$ and based on the weight of $Al_2O_3$.

The production of mesoporous $Al_2O_3$ structures, particularly of chemically and thermodynamically highly stable corundum ($\alpha$-$Al_2O_3$), presents a particular difficulty in relation to prior art. In the sol/gel-processes, the formation of corundum requires the maintenance of certain minimum annealing temperatures, while alternatively, a quick sintering must be expected when highly sinteractive nanocorundum powder is being used. This quick sintering is due to the high sintering activity, which results from the small curvature radius of the particle surfaces. In both cases, a quick reduction of the open porosity during ignition (calcination, sintering) occurs. The dopant according to the present invention counteracts the above and allows the production of mesoporous structures comprising corundum and having high porosity. Both sol/gel technologies and powder technologies can be used in the present invention.

However, the advantage of a phase structure comprising corundum need not be specifically stressed for more coarsely structured intermediate layers or substrates with pore sizes preferably from about 100 to about 500 nm. Although corundum is also particularly advantageous here, it is readily employable within the range of the present invention by using commercial corundum powder and/or with by igniting sol/gel derived products having dopant at temperatures above the temperatures of corundum formation.

In this regard, in accordance with the present invention, sol/gel processes are particularly advantageous since such structures comprising corundum could not be produced using sol/gel previously.

However, the advantage for many applications, particularly of corundum products, does not limit the utilization of the dopant according to the present invention for other purposes where, e.g., $Al_2O_3$ phases other than corundum might be more suitable for catalytic converter substrates. It is within the scope of the present invention to produce $Al_2O_3$ products having phase compositions other than corundum, which are stable and have high porosity and optimal pore sizes which can be controlled.

In the present invention, the raw materials can include corundum itself, or corundum doped with Zr and/or $ZrO_2$ or any corundum precursor. A corundum precursor is any aluminum compound which will form corundum. The specification also states that numerous corundum precursors may be utilized in the present invention. The precursors include, but are not limited to, aluminum salts (such as aluminum nitrate, aluminum sulfate, alum, aluminum chloride and the like), aluminum alcoholate (such as Al(OR)$_3$ where R is alkyl from 1 to 9 and preferably R can be CH$_3$, C$_2$H$_5$, C$_3$H$_7$ or C$_4$H$_9$), aluminum hydroxides, (such as Al(OH)$_3$ or aluminum polyhydroxides), boehmite, diaspore, transitional alumina (such as γ, δ, θ, or κ-Al$_2$O$_3$ as well as corundum itself.

In accordance with the present invention, the dopant leads to the maintenance of a high porosity during the annealing up to the high temperatures necessary for production of porous products. This results in an additional advantage in that the porous products can be used in high temperature ranges.

The present invention is further described in detail for sol/gel processes and powder technical processes using exemplary embodiments. Here, the examples of powder technical processes are described with a broad range of different corundum material having intermediate particle sizes from about 50 nm to about 1.5 μm.

The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLES

Example 1

Sol/gel Technology; 50–200 nm Pore Size

Boehmite (DISPERAL®, a produced by Condea Chemie, Hamburg, Germany) is used as the raw material for sol/gel production of more coarsely structured filtration layers. This boehmite is a colloidal aluminum monohydrate (AlOOH) whose specific surface is 188 m$^2$/g determined according to the BET method. The primary particle size according to TEM images is approximately 2–7 nm while size distributions, measured in suspension, result in average particle sizes from about 30 to about 60 nm depending on the agglomeration.

Using an agitator and ultrasound, 100 g of boehmite is dispersed for 30 minutes in 180 ml distilled water at pH of about 3; the pH value being adjusted by adding 10% nitric acid. After adding 2.7 g ZrOCl$_2$.8H$_2$O as a solution in 20 ml distilled water, the sol is agitated for another hour in the ultrasound bath and subsequently is poured as a 5 mm thick layer into a glass shell. After a 12-hour drying in the drying cabinet at 80° C., the resulting gel is broken, granulated, and sifted into a granulate with a particle size of 1–2 nm. The Zr content expressed as an oxide is 1.2 weight % ZrO$_2$ based on the weight of Al$_2$O$_3$.

The dried samples are sintered in air in a pressure-free fashion. The heating rate is 3 K/min up to about 550° C. and subsequently 5 K/min up to the respective sintering temperature, which is followed by an isothermal holding time of 2 hours. The open porosity and the pore size is determined by Hg porosimetry.

Sintering at final temperatures between 1215 and 1370° C. leads to a quadrupling of the average pore size in the case of constant open porosity in the range of 40.65±0.59 vol. %; radiographic phase analysis shows that all samples have completely transformed into corundum (α-Al$_2$O$_3$).

| Sintering temperature in ° C. | 1215 | 1235 | 1260 | 1300 | 1350 | 1370 |
|---|---|---|---|---|---|---|
| Open porosity in % | 41.2 | 40.6 | 40.2 | 40.0 | 41.5 | 40.5 |
| Total porosity in % | 42.9 | 43.5 | 42.8 | 41.8 | 43.9 | 42.0 |
| Average pore size in nm | 56 | 63 | 73 | 96 | 196 | 199 |

For comparison purposes, an experiment is performed without the addition of the ZrO$_2$ but under otherwise identical conditions. After sintering at 1000° C., the open porosity is still 49.7% (with an average pore size of 12 nm), but has already shrunk to only 36% at 1200° C. and a pore size of 13 nm. Further comparison experiments are conducted with dopants, such as La, Si, Ca, and Mg, which are recommended in U.S. Pat. No. 5,837,634, which is incorporated by reference herein in its entirety, for preventing decomposition of porosity at higher temperatures. However, all of these dopants lead constantly to pore sizes of less than 70 nm at porosities of less than or equal to 30% and slightly higher porosities of less than or equal to 35% can be attained with smaller pores less than 15 nm.

Example 2

Ceramic with Pores of a Size of 100–350 nm, Produced from Coarser Aluminas

Commercially available aluminas, A16SG® (Alcoa Company, USA) having an average grain size approximately 0.5 μm and CT1200® (Alcoa Company, USA) having a grain size of approximately 1.4 μm are dispersed by an agitator and ultrasound for 30 minutes in distilled water with known dispersing agents (HNO$_3$,DOLAPIX® CE 64 available from Zschimmer & Schwarz). An additional dispersion milling is performed in a laboratory agitator ball mill using 3Y-TZP milling balls (Y partially stabilized ZrO$_2$, Tosoh Company, Japan) to add ZrO$_2$ dopant as abrasion from a milling ball; the running time is 2 hours with the A16SG compositions having solid material contents from about 60 to about 75 weight %, while compositions with 60 weight % of the coarser alumina CT1200 are ground for 4 hours and those with 71 weight % of CT1200 are ground for 1 hour. In this manner, suspensions having different concentrations of the ZrO$_2$ dopant are obtained. An undoped comparison sample of A16SG alumina is irradiated with ultrasound without grinding for only one hour.

All suspensions are poured in a glass shell with a 5 mm layer thickness and are granulated and sifted as described in Example 1 after a 24-hour drying at 60° C. The sintering as well as the determination of porosity and pore size is the same as in Example 1.

The table below depicts the results with and without ZrO$_2$ dopant with respect to sintering at final temperatures of 1200 and 1300° C. The ZrO$_2$ dopant products are highly porous corundum products with enlarged pores, as contrasted to the ZrO$_2$-free composition. The value for open porosity is in vol. % followed by a slash and the value for average pore size in nm.

| ZrO$_2$ concentration (added as abrasion from a milling ball; precision ± 0.1%) | Alumina A16SG sintered at 1200° C. | Alumina A16SG sintered at 1300° C. | Alumina CT1200 sintered at 1300° C. |
|---|---|---|---|
| 0 | 22.1%/87 nm | — | — |
| 0.8% | 46.1%/126 nm | 34.2%/121 nm | 34.3%/276 nm |
| 2.4% | — | 44.6%/146 nm | — |
| 4.5% | — | — | 51.0%/315 nm |

Example 3

Corundum Membrane with 50 nm Pores, Produced from Commercial Corundum Powder Using ultrasound and an agitator, 100 g of fine grain corundum alumina (TAIMICRON® TM-DA, obtained from Böhringer-Taimai, Japan) having an average grain size of approximately 0.2 μm is dispersed for 30 minutes in 35 ml distilled water at pH of about 4; the pH value is again adjusted by adding nitric acid. After adding 2.7 g ZrOCl$_2$.8H$_2$O as a solution in 5 ml of distilled water, the suspension is agitated in an ultrasound bath for 2 hours and is poured out as a 5 mm thick layer in a glass shell, is dried for 12 hours at 80° C. and is subsequently granulated and sifted as described in Example 1. As in Example 1, the Zr content, expressed as an oxide is 1.2 weight % ZrO$_2$ based on the weight of Al$_2$O$_3$. The sintering as well as the determination of porosity and pore size is the same as in Example 1.

Using a commercial corundum powder as a raw material guarantees a product structure comprising pure corundum. This has also been radiographically verified. Using the Zr dopant in accordance with the present invention results in a consistently high open porosity and constant pore size over a larger range of annealing temperatures. At 800° C., the resulting product has an open porosity of 41.2 vol. % and an average pore size of 48 nm. At 1000° C., the resulting product has an open porosity of 39.1 vol. % and an average pore size of 49 nm. At 1100° C., the resulting product has an open porosity of 39.3 vol. % and a average pore size of 51 nm.

A comparison experiment without Zr dopant under otherwise identical conditions results in structures which, despite their limitation to only smaller attainable pores of less than or equal to 40 nm, still have a low, unsatisfactory porosity of less than or equal to 32%.

Example 4

Porous Alumina Ceramic with 50 nm Pores, Produced from Nano Alumina

A nano alumina powder is used as described in DE 199 22 492; the particle size is from about 50 to about 100 nm. In order to prepare the suspension, the alumina powder is dispersed in water at pH of about 4 by grinding; the dopant according to the present invention is added by grinding 3Y-TZP milling balls (Y partially stabilized ZrO$_2$, Tosoh Company, Japan). The original ground suspensions have a solid material content of 33 weight %; after 3 hours grinding, ZrO$_2$ is added by grinding to about 0.6 weight % (based on the weight Al$_2$O$_3$ solids) to the suspension; the suspension is diluted to about 20 weight %; and, with the pH value being constantly maintained at about 4.0, the suspension is agitated for another hour in the ultrasound bath. The suspension is subsequently poured out in a glass shell as a 2–3 mm thick layer and is dried for 12 hours at 90° C. A 2-hour isothermal sintering in air at 1100° C. and 1200° C. follows the drying.

The porosity and pore size are determined as in example 1.

After annealing, the composition with ZrO$_2$ in accordance with the present invention exhibits the following pore structures: At 1100° C., the composition has an open porosity of 43.7 vol. % (the total porosity being 51.4%) and an average pore size of 47 nm. At 1200° C., the composition has an open porosity of 41.1 vol. % (the total porosity being 44.5%) and an average pore size of 55 nm.

From the foregoing description, one skilled in the art can easily ascertain the essential characteristics of this invention, and without departing from the spirit and scope thereof, can make various changes and modifications of the invention to adapt it to various usages and conditions.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A porous aluminum oxide structure comprising Al$_2$O$_3$ and Zr, the structure having an open porosity greater than about 30% and an average pore size between about 20 nm to about 1000 nm, wherein the Zr, expressed as ZrO$_2$, has a concentration less than about 5 weight % of the weight of the Al$_2$O$_3$.

2. The porous aluminum oxide structure according to claim 1, having an open porosity greater than about 40% and wherein the Al$_2$O$_3$ comprises α-Al$_2$O$_3$.

3. The porous aluminum oxide structure according to claim 1, having an average pore size between about 20 nm to about 60 nm.

4. The porous aluminum oxide structure according to claim 1, having an average pore size between about 50 nm to about 1000 nm.

5. The porous aluminum oxide structure according to claim 1, wherein the Al$_2$O$_3$ comprises α-Al$_2$O$_3$ and wherein the structure has an open porosity greater than about 40% and an average pore size between about 20 nm to about 60 nm.

6. The porous aluminum oxide structure according to claim 1, having an open porosity greater than about 30% and an average pore size from about 50 to about 1000 nm.

7. The porous aluminum oxide structure according to claim 6, having an open porosity greater than about 40%.

8. The porous aluminum oxide structure according to claim 1, wherein the Al$_2$O$_3$ comprises α-Al$_2$O$_3$ and the Zr, expressed as ZrO$_2$, has a concentration from about 0.03 to about 1.5 weight % of the weight of the Al$_2$O$_3$.

9. The porous aluminum oxide structure according to claim 8, wherein the structure has an open porosity greater than about 40% and an average pore size from about 20 to about 60 nm.

10. A porous aluminum oxide structure comprising α-$Al_2O_3$ and Zr, the structure having an open porosity greater than about 30% and an average pore size from about 20 to about 1000 nm, wherein the Zr, expressed as $ZrO_2$, has a concentration less than about 5 weight % of the weight of the $Al_2O_3$.

11. The porous aluminum oxide structure according to claim 10, having an average pore size from about 50 to about 1000 nm.

12. The porous aluminum oxide structure according to claim 10, having an average pore size from about 20 to about 60 nm.

13. The porous aluminum oxide structure according to claim 12, wherein the Zr has a concentration which, expressed as $ZrO_2$ and based on $Al_2O_3$, constitutes from about 0.03 to about 1.5 weight % of the weight of the $Al_2O_3$.

14. A process for producing a porous aluminum oxide structure comprising $Al_2O_3$ and Zr, the structure having an open porosity greater than about 30% and an average pore size from about 20 to about 1000 nm, through doping alumina or precursors thereof with a doping effective amount of Zr, wherein the Zr, expressed as $ZrO_2$, has a concentration less than about 5 weight % of the weight of the $Al_2O_3$, the process comprising:
  introducing the Zr into the alumina or the precursors thereof, the Zr being selected from the group consisting of at least one $ZrO_2$ powder, a solution of a Zr precursor, or mixtures thereof, by admixing the Zr with the alumina or the precursors thereof,
  forming a green body,
  drying the green body, and
  sintering the dried body to produce the porous aluminum oxide structure.

15. The process of claim 14, wherein the sintering takes place at a temperature from about 700° C. to about 1600° C.

16. The process of claim 15, wherein the sintering takes place at a temperature from about 850° C. to about 1400° C.

17. The process of claim 16, wherein the sintering takes place at a temperature from about 900° C. to about 1370° C.

18. the process of claim 14, wherein the introducing the Zr into the alumina or the precursors thereof comprises admixing the Zr in the alumina or the precursors thereof.

19. The process of claim 14, wherein the introducing the Zr into the alumina or the precursors thereof comprises introducing the at least one $ZrO_2$ powder into the alumina or the precursors thereof through milling a suspension of the alumina or the precursors thereof with $ZrO_2$ balls.

20. The process of claim 14, wherein the green body is formed by casting the admixture into a mold.

21. The process of claim 14, wherein the green body is formed by dip coating a porous substrate to form a membrane layer.

* * * * *

UNITED STATES PATENT AND TRADEMARK OFFICE
CERTIFICATE OF CORRECTION

PATENT NO. : 6,399,528 B1
DATED : June 4, 2002
INVENTOR(S) : Dr. A. Krell et al.

It is certified that error appears in the above-identified patent and that said Letters Patent is hereby corrected as shown below:

Column 2,
Line 43, "grain limits" should be -- grain boundaries --.

Column 3,
Lines 58-59, "producing a porous aluminum comprising" should be -- producing a porous aluminum oxide structure comprising --.

Column 5,
Lines 42-43, "contaminates the surface of the still highly porous $Al_2O_3$ in such a way that" should be -- contaminates the particle surfaces of the still highly porous $Al_2O_3$ bodies in such a way that --.

Signed and Sealed this

Twelfth Day of November, 2002

Attest:

Attesting Officer

JAMES E. ROGAN
Director of the United States Patent and Trademark Office